United States Patent [19]

Boucher

[11] Patent Number: 4,719,405

[45] Date of Patent: Jan. 12, 1988

[54] HIGH VOLTAGE CURRENT REGULATOR

[75] Inventor: C. Wendell Boucher, San Luis Obispo County, Calif.

[73] Assignee: Emerson Electric Co., St. Louis, Mo.

[21] Appl. No.: 944,226

[22] Filed: Dec. 22, 1986

[51] Int. Cl.[4] .............................................. G05B 24/02

[52] U.S. Cl. .................................... 323/352; 323/364; 323/902; 250/209

[58] Field of Search ........................ 323/352, 364, 902; 250/209, 552, 578

[56] References Cited

U.S. PATENT DOCUMENTS 4,138,635 2/1979 Quinn ................................. 323/902

4,140,962 2/1979 Quinn ................................. 323/902

FOREIGN PATENT DOCUMENTS 0445155 9/1974 U.S.S.R. .............................. 323/902

OTHER PUBLICATIONS

Sokoloski et al., "An Automatic Voltage Control Circuit", Rev. Sci. Instrum, vol. 45, No. 2, 2/74, p. 295.

*Primary Examiner*—Patrick R. Salce

*Assistant Examiner*—Jeffery Sterrett

*Attorney, Agent, or Firm*—Polster, Polster and Lucchesi

[57] ABSTRACT

A high voltage power supply current regulator includes at least one high voltage rectifier diode having a plurality of pn junctions, said diode being adapted to be connected between a high voltage power supply whose current is to be regulated and a load such that the diode is reverse biased. A control circuit, operating at a voltage which is relatively low compared with the power supply voltage, controls the reverse current through the diode to the load. The reverse current constitutes the load current. The control circuit includes a light source for illuminating the pn junctions of the diode with a predetermined flux of photons, the reverse current through the diode being a function of the photon flux on the diode junctions.

20 Claims, 12 Drawing Figures

HIGH VOLTAGE CURRENT REGULATOR

BACKGROUND OF THE INVENTION

This invention relates to current regulators and more particularly to current regulators for supplying relatively low currents at relatively high voltages.

Certain applications require that a relatively low current of, for example, from 20 microamps to 500 microamps, be accurately regulated and supplied to a load at a relatively high voltage of, for example, 3 kilovolts. One such application is in a focus supply for driving cathode ray tubes, for example. High voltage transistors are available for relatively high voltages, such as 1.5 kilovolts. But the leakage currents of these transistors exceed the desired currents to be supplied to these particular loads. The prior art has addressed this problem of controlling relatively low currents at relatively high voltages by stacking transistors to achieve the high voltage control. Conventional transistors, however, are susceptible to a phenomenon called second-breakdown, brought about by exceeding the collector-emitter voltage ratings. To prevent this from happening, the stacked transistors have to be surrounded with protective components. This adds undesirable size and complexity to the prior art current regulators.

It is sometimes desired, instead of supplying a constant current to a load, to modulate that current. Such modulation is required, for example, in dynamic focusing for cathode ray tubes. In such tubes the scanning beam must be accelerated at the edges of the tube, which requires a change in the focusing current. Adding such a feature to conventional current regulators only adds to the already complex circuitry.

SUMMARY OF THE INVENTION

Among the objects and features of the present invention may be noted the provision of a current regulator for regulating relatively low currents at relatively high voltages, which regulator is relatively simple in construction.

Another object of the present invention is the provision of such a current regulator which is relatively inexpensive.

A third object of the present invention is the provision of such a current regulator in which modulation of the current is easily implemented.

An additional object of the present invention is the provision of a current regulator which is relatively small in size.

Other objects and features will be in part apparent and in part pointed out hereinafter.

Briefly, a high voltage power supply current regulator of the present invention includes at least one high voltage rectifier diode having a plurality of pn junctions and adapted to be connected between a high voltage power supply whose current is to be regulated and a load such that the diode is reversed biased. Control means operating at a voltage which is relatively low compared with the power supply voltage controls the reverse current through the diode to the load, which reverse current constitutes the load current. The control means includes means for illuminating the pn junctions of the diode with a predetermined flux of photons, the reverse current through the diode being a function of the photon flux on the diode junctions.

The method of the present invention includes the step of disposing at least one reverse biased high voltage diode between the load and the high voltage power source. The pn junctions of the diode are illuminated with a photon flux selected to provide a predetermined reverse current through the diode, which reverse current constitutes the load current.

BRIEF DESCRIPTION OF THE DRAWINGS

Similar reference characters indicate similar parts throughout the several views of the drawings.

DESCRIPTION OF THE PREFERRED EMBODIMENT

Figure 1:
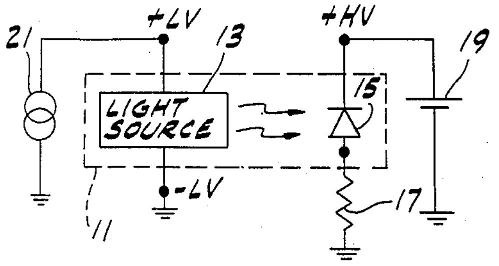
FIG. 1 is an electrical schematic of a current regulator of the present invention connected to a high power voltage source.

Turning now to the drawings, a current regulator 11 of the present invention includes a light source 13 for supplying a photon flux to the pn junctions of a high voltage rectifier diode 15. Diode 15 has a plurality (e.g. six to eight) of pn junctions in series. It has been found that when high voltage rectifier diode 15 is reversed biased, the leakage current can be enhanced by the photons from regularly available light sources such as an incandescent bulb or a light emitting diode to provide reverse or leakage currents of the desired magnitudes for driving a load 17. More specifically, diode 15 is connected in the reverse biased configuration shown in FIG. 1 between a high voltage power source 19 and the load 17. Light source 13 is driven by a current source 21 to generate photons. When these photons fall upon the pn junctions of the high voltage rectifier diode, the reverse or leakage current of the diode is enhanced. In fact, the reverse or leakage current is proportional to the current from current source 21. As a result, the load current to load 17 can be modulated by modulating the current from current source 21. It has been found that a three kilovolt peak inverse voltage rectifier diode sold by Semtech works very well for diode 15.

Figure 2:
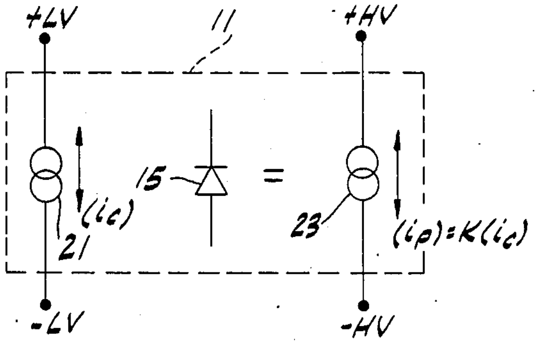
FIG. 2 is a schematic illustrating the transfer function of the current regulator of FIG. 1.

FIG. 2 illustrates the transfer function of current regulator 11 of the present invention. A control current $i_C$ is passed through a device such as light source 13 to emit photons. The photons fall upon high voltage rectifier diode 15 causing a current $i_P$ to flow therethrough to the load, which current is proportional to current $i_C$ with a constant of proportionality K. The control current $i_C$ and the reverse diode current $i_P$ are electrically isolated from one another because their only coupling is optical. As a result, the high voltage side of current regulator 11 is a floating current generator 23. It should be appreciated that current generator 21 need not generate a constant current $I_C$, but rather is capable of generating a variable current $i_C$ for those applications that require a variable or modulated current.

Figure 3:
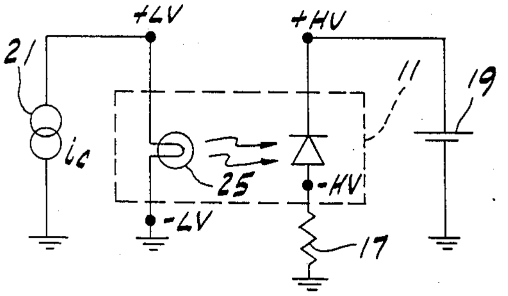
FIG. 3 is an electrical schematic showing one embodiment of the current regulator of the present invention.
Figure 4:
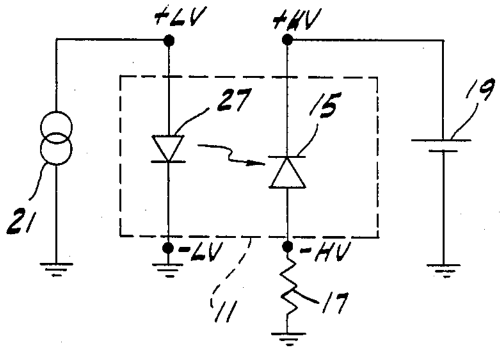
FIG. 4 is an electrical schematic illustrating a second embodiment of the current regulator of the present invention.
Figure 5:
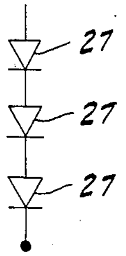
FIG. 5 is an electrical schematic illustrating a series connection for light sources making up a portion of the current regulator of the present invention.
Figure 5A:
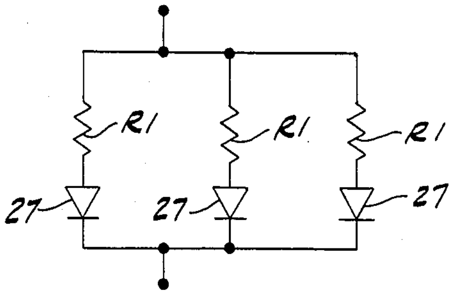
FIG. 5A is an electrical schematic illustrating a parallel connection for light sources making up a portion of the current regulator of the present invention.

In FIG. 3, an incandescent bulb 25 is shown constituting light source 13. Alternatively, (FIG. 4) a light emitting diode 27 may be used as a source of photons which enhance the leakage current of high voltage rectifier diode 15. It should be realized however, that a single light emitting element such as incandescent bulb 25 or light emitting diode 27 may not have a sufficient photon flux to enhance the reverse current of high voltage rectifier diode 15 to the desired predetermined amount. For example, although a single light emitting diode 27 can control currents up to around 20 microamperes, it would be incapable of producing enough photons to provide a controlled current of 1 milliamp. In addition, the photon output of light emitting diodes is significantly lower than that of incandescent bulbs 25. Nevertheless, light emitting diodes are preferred because of their fast response. To increase the photon flux from a light emitting diode source, one can use a plurality of light emitting diodes 27 connected in series as shown in FIG. 5 or in parallel as shown in FIG. 5A. In FIG. 5, the diodes are connected in series so that the same control current flows through all the diodes. In FIG. 5A, diodes 27 are connected in parallel with each parallel branch including a current sharing resistor R1. Resistors R1 are necessary unless matched diodes are selected for diodes 27.

Similarly, the reverse current of a single high voltage rectifier diode 15 may not be sufficient for a given application. For that reason, the circuit shown in FIG. 6 may be used if higher load currents are desired. In this circuit, a plurality (e.g. six) of high voltage rectifier diodes 15 are connected in parallel between the high voltage source 19 and the load 17. Each is reverse biased and the sum of the reverse currents through the diodes 15 constitutes the load current. Also, in FIG. 6 a series connection of twelve light emitting diodes 27 provide the photon flux to the plurality of rectifier diodes 15.

Figure 6:
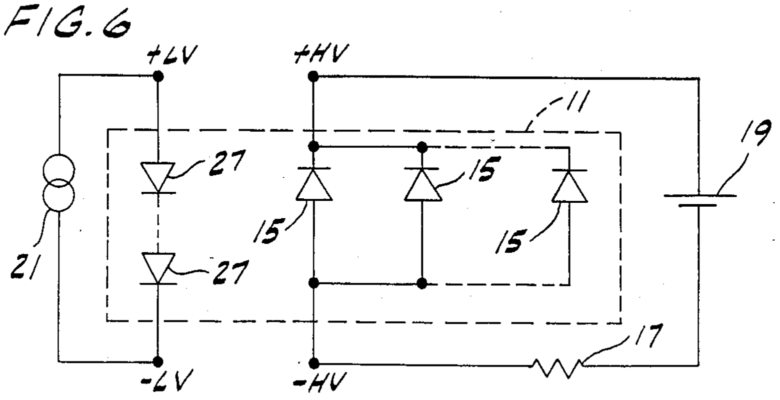
FIG. 6 is an electrical schematic of a third embodiment of the current regulator of the present invention, using the circuit of FIG. 5.

The circuit of FIG. 6 has been found to be sufficiently insensitive to temperature for many applications. However, in the event more precise control of the load current is desired, the circuit of FIG. 7 can be used. In this circuit, a sensing device 31 is provided to actually sense the photon flux incident upon the pn junctions of diodes 15 to increase or decrease the current through light emitting diodes 27 as necessary to maintain the photon flux at the desired level. Sensing device 31 is a single rectifier diode chip located in a housing of current regulator 11 in such a way as to sense the ambient photon level within the housing of the regulator. The diode need only be a simple low peak inverse rated diode with a single junction. Peak inverse voltages of 100 to 300 volts are typical. Like diodes 15, diode 31 is operated in the inverse mode with the normal reverse leakage current enhanced by the photon bombardment. As the photon level increases, diode 31 is used to limit the maximum current supplied to light emitting diodes 27. Diode 31 has two terminals 31A and 31B extending out of the housing of current regulator 11. The cathode is connected to terminal 31A while the anode of diode 31 is connected to terminal 31B. Terminal 31A is also connected to a source of relatively low voltage so that diode 31 is reverse biased. Terminal 31B is connected through a resistor R1 to ground. A comparator 32 or similar device has its input terminals connected across resistor R1 to sense the voltage across the resistor. This voltage is proportional to the reverse current through diode 31, which in turn is proportional to the photon level in the housing of regulator 11. The output of comparator 32 thus represents the photon level in the housing. This output is supplied to a current control circuit 32A of conventional construction. When the photon level falls below a predetermined threshold, as can occur when the ambient temperature of light emitting diodes 27 increases, current control 32A increases the current supplied to 27 so that the photon level reaches and is maintained at the predetermined threshold.

Figure 8:
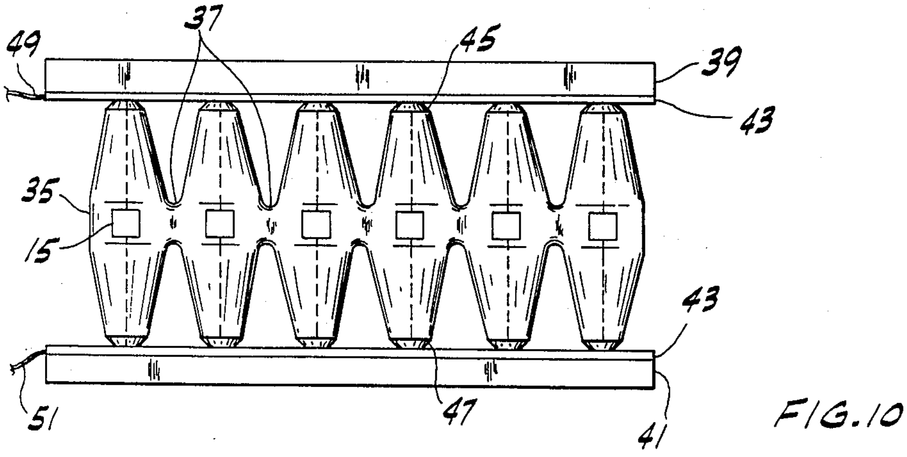
FIG. 8 is a side elevation of a high voltage portion of the current regulator of the present invention.

Diode 15 as received from the manufacturer is a multi-layer series rectifier diode encapsulated in a glass jacket 35 (FIG. 8). The manufacturer coats this glass jacket with paint to prevent the pn junctions of the diode from being exposed to photons, thereby limiting the reverse current. It is necessary to remove this paint in the area of the pn junctions before the diodes are used in the present invention. The glass jacket serves to diffuse the light from diodes 27 to provide a more even illumination of all the pn junctions. To construct the current regulator 11 of FIG. 6, a plurality (e.g. six) of glass encapsulated rectifier diodes 15 are aligned as shown in FIG. 8 and secured together by a suitable means such as epoxy 37. The set of six diodes is mounted between a pair of substrates 39 and 41, each of which includes a beryllia layer 43 adjacent the electrical contacts of the diodes. The rest of substrates 39 and 41 are glass or some other suitable material. Electrical contact to the diodes is made through a set of contacts 45 and 47 disposed on the beryllia layers of substrates 39 and 41, respectively. Contacts 45 are connected together by suitable gold connections (not shown) while similar gold connections make electrical contact between contacts 47. A pair of leads 49 and 51 provide an electrical connection between contacts 45 and the power source and contacts 47 and the load. Rectifier diodes 15 are thus connected in parallel in FIG. 8.

Figure 10:
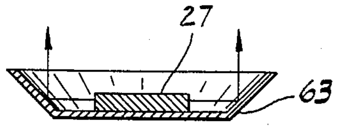
FIG. 10 is a cross-sectional view taken generally along line 10—10 of FIG. 9.
Figure 9:
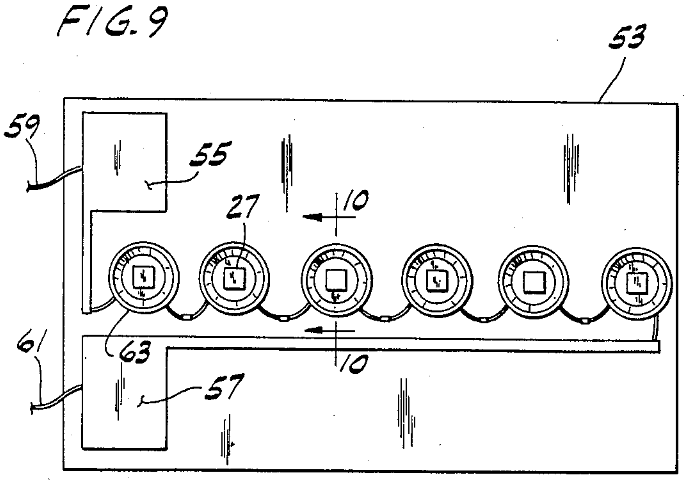
FIG. 9 is a top plan of one-half of a low voltage portion of the current regulator of the present invention.

Six of the light emitting diodes 27 of FIG. 6 are shown in FIG. 9 mounted on a beryllia substrate 53. The substrate has a pair of pads 55 and 57 to which are connected leads 59 and 61 for electrically connecting the light emitting diodes to the low voltage current source. The light emitting diodes are connected in series as shown in FIG. 9 by suitable conductors so that current on lead 59 passes through all six diodes 27 and out lead 61. Each light emitting diode is mounted in a gold reflector 63 as shown in FIG. 10. The photons from each light emitting diode 27 are emitted preferentially from the sides of the diode. Reflector 63 has an angled sidewall which circumferentially surrounds diode 27. The sidewall makes an angle of approximately 45 degrees with the photons from light emitting diode 27 so that as the photons strike the wall of the reflector they are preferentially reflected vertically as shown in FIG. 10. This concentrates the photon flux from each light emitting diode in the proper direction.

Figure 11:
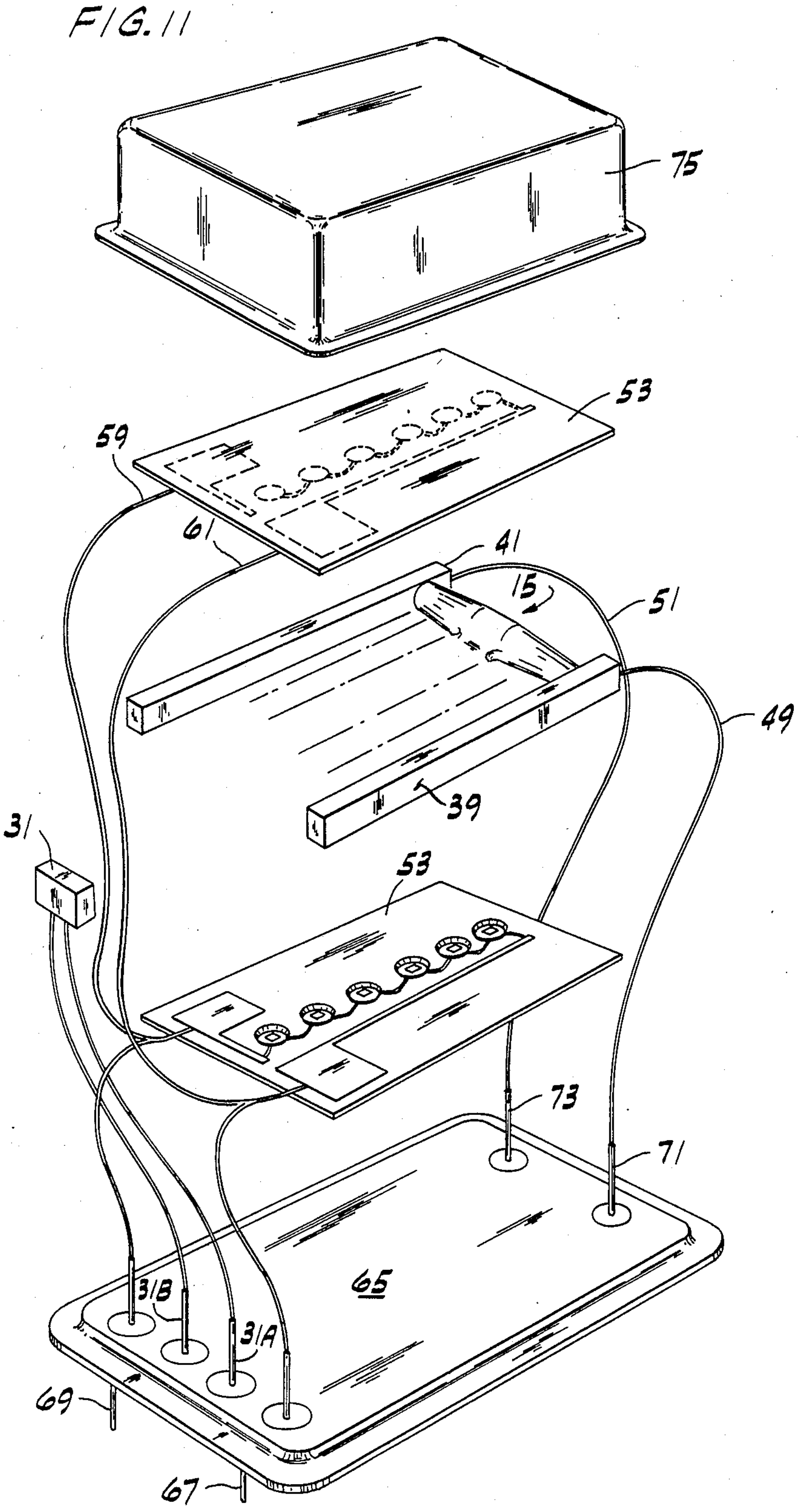
FIG. 11 is an exploded perspective of the current regulator of the present invention.

As seen in FIG. 11, the rectifier diodes 15 are disposed between a pair of light emitting diode substrates 53, each of which have mounted thereto six light emitting diodes 27. The light emitting diodes are arranged in rows on substrates 53, which rows are parallel to and centered over the pn junctions of rectifier diodes 15. With the arrangement shown, a pair of light emitting diodes are disposed directly above and below each of the rectifier diodes 15 so that an adequate flux of photons will be incident upon the pn junctions of that particular diode 15. This entire assembly is suitably secured together and mounted upon a base 65 having four terminals 67, 69, 71 and 73, and terminals 31A and 31B extending therefrom. A cover 75 is then suitably secured to base 65 to protect the components of current regulator 11. Sensing diode 31 is suitably secured to the inside of cover 75 so that it is exposed to the photon flux inside the regulator 11. It should be appreciated that the electrical connections to the light emitting diodes are made to terminals 67 and 69 while the connections to the high voltage rectifier diodes are made through terminals 71 and 73. As shown, all the low voltage terminals are disposed at one end of base 65 while all the high voltage terminals are disposed at the other end. With this particular construction, it has been possible to make a current regulator having overall dimensions (including the case or housing made up of cover 75 and base 65) of $1'' \times \frac{1}{2}'' \times \frac{1}{4}''$. This current regulator is capable of controlling a load current of 200 to 500 microamperes at approximately 3 kilovolts. As should be appreciated, this unit is much smaller, less complex and less expensive than prior transistor-based devices which perform the same function.

Figure 7:
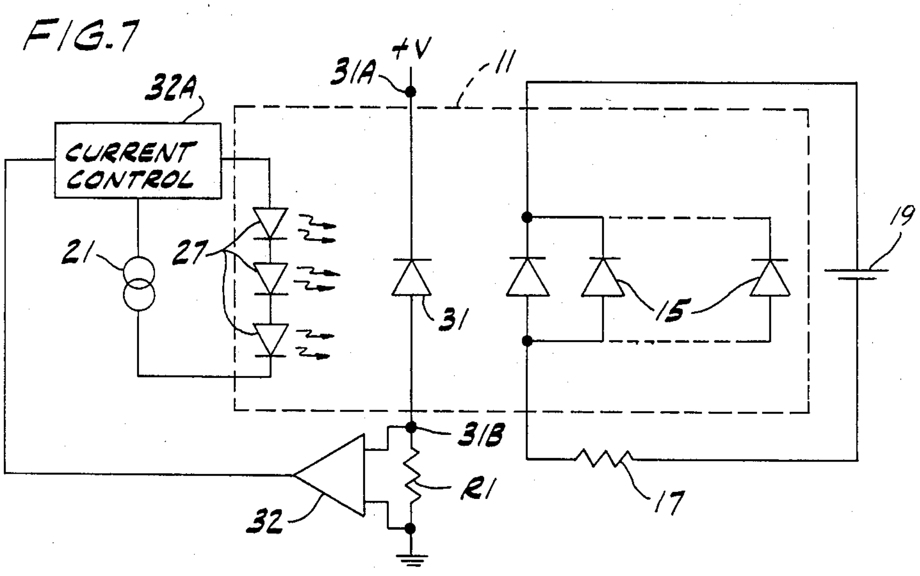
FIG. 7 is an electrical schematic illustrating a fourth embodiment of the current regulator of the present invention.

From the above description, it should be realized that current regulator 11 of the present invention performs the same function as would a high voltage transistor, if one were available, but with some significant advantages. First, the load current from current regulator 11, which is proportional to the amount of photons coupled to the rectifiers, is analogous to the leakage current referred to as ICBO in transistors. The major difference is that in a transistor, ICBO current entering the base region eventually encounters an impedence connected to the base which tends to further enhance the ICBO current in undesirable ways. Current regulator 11, on the other hand, however, has no base connection and so the reverse current is exclusively controlled by photon coupling and the ambient temperature, with the design such that the contribution produced by the ambient temperature is trivial. (If the application is such that the ambient temperature contribution is not trivial, the embodiment of FIG. 7 is used.) Second, a conventional transistor has three connections: the emitter, the base, and the collector. Accordingly, the power supply phasing determines whether a pnp or npn-type transistor can be used. The present current regulator has only 2 connections for the controlled current and two connections for the controlling current. This means it is not phase conscious. In other words it can be used to control positive or negative potentials, and it can be controlled by means of positive or negative potentials. Third, apart from the fact that current regulator 11 does not have a base connection as a transistor does, from a black-box standpoint it can look like a transistor, but with a voltage rating far in excess of the present state of the art for transistors.

From the above, it will be appreciated that the method of the present invention includes the steps of disposing at least one reverse biased, high voltage diode having a plurality of pn junctions between the load and the power source and illuminating the pn junctions of the diode with a photon flux selected to provide a predetermined reverse current through the diode, which reverse current constitutes the load current.

From the above it will also be seen that the various objects and features of the present invention are achieved and other advantagous results obtained.

As various changes could be made in the above constructions and method without departing from the scope of the invention, it is intended that all matter contained in the above description or shown in the accompanying drawings shall be interpreted as illustrative and not in a limiting sense.

I claim:

1. A high voltage power supply current regulator comprising:

at least one high voltage rectifier diode having a plurality of pn junctions and adapted to be connected between a high voltage power supply whose current is to be regulated and a load such that the diode is reversed biased; and control means operating at a voltage which is relatively low compared with the power supply voltage for controlling the reverse current through the diode to the load, which reverse current constitutes the load current, said control means including means for illuminating the pn junctions of the diode with a predetermined flux of photons, the reverse current through the diode being a function of the photon flux on the diode junctions.

2. The current regulator as set forth in claim 1 wherein the illuminating means includes a light source connected to a current source, the reverse current of the diode being proportional to the current from the illuminating means current source and electrically isolated therefrom.

3. The current regulator as set forth in claim 2 further including means for sensing the photon flux from the light source for adjusting the current from the current source in response to the sensed photon flux to maintain the photon flux relatively constant.

4. The current regulator as set forth in claim 1 wherein the illuminating means includes a plurality of light-emitting diodes optically coupled to the pn junctions of the high voltage rectifier diode.

5. The current regulator as set forth in claim 1 further including a plurality of reverse biased, high voltage rectifier diodes connected in parallel between the high voltage supply and the load.

6. The current regulator as set forth in claim 5 wherein the illuminating means includes a plurality of light sources, each operative high voltage rectifier diode having at least one of the plurality of light sources optically coupled thereto to cast the predetermined flux of photons thereon.

7. The current regulator as set forth in claim 6 wherein the plurality of light sources are a plurality of light-emitting diodes connected in series with a current source so that the photon flux from each light emitting diode is generally the same.

8. The current regulator as set forth in claim 7 wherein each high voltage rectifier diode has a pair of light-emitting diodes optically coupled therewith.

9. The current regulator as set forth in claim 1 wherein the pn junctions of the rectifier diode are separated from the illuminating means by a dielectric having a dielectric strength sufficient to prevent electrical breakdown between the rectifier diode and the illuminating means.

10. The current regulator as set forth in claim 1 further including a plurality of high voltage rectifier diodes connected in parallel between the high voltage source and the load, such that each rectifier diode is reverse-biased, each rectifier diode having a plurality of pn junctions, said illuminating means including means for illuminating the pn junctions of each rectifier diode with a predetermined flux of photons, the load current being the sum of the reverse currents through the rectifier diodes.

11. The current regulator as set forth in claim 10 wherein the illuminating means includes a plurality of light-emitting diodes and further includes means for directing the photons from the light-emitting diodes to the pn junctions of the rectifier diodes.

12. The current regulator as set forth in claim 11 wherein the plurality of high voltage rectifier diodes are physically mounted between a pair of generally flat, parallel substrates, and wherein the plurality of light-emitting diodes are physically mounted on a pair of generally flat, parallel substrates disposed at right angles to the rectifier substrates.

13. The current regulator as set forth in claim 11 wherein the directing means include reflectors surrounding each light-emitting diode in one plane for reflecting the photons in a direction perpendicular to said plane.

14. The current regulator as set forth in claim 13 wherein the reflectors are disposed in two, facing rows and the rectifier diodes are disposed intermediate the two rows of reflectors.

15. The current regulator as set forth in claim 13 wherein the light-emitting diode reflectors are disposed in at least one line and the rectifier diodes are disposed in a second line, said reflector line and said rectifier diode line being parallel.

16. The current regulator as set forth in claim 15 wherein each rectifier diode has a body which extends generally perpendicularly to said lines, the cathode connection of each being disposed at one end of the body and the anode connection of each being disposed at the opposite end of the body.

17. The method of regulating the current from a high voltage power source to a load comprising the steps of:

disposing at least one reverse biased high voltage diode having a plurality of pn junctions between the load and the power source; and illuminating the pn junctions of the diode with a photon flux selected to provide a predetermined reverse current through the diode, said reverse current constituting the load current.

18. The method as set forth in claim 17 wherein the disposing step includes the step of disposing a plurality of reverse biased, high voltage diodes in parallel between the load and the power source.

19. The method as set forth in claim 18 wherein the illuminating step includes illuminating the pn junctions of each of the diodes, the load current being the sum of the diode reverse currents.

20. The method as set forth in claim 17 further including the step of sensing the photon flux to regulate the reverse current.

* * * * *